US00RE41465E

(19) United States
(12) Reissued Patent
Yamashita et al.

(10) Patent Number: US RE41,465 E
(45) Date of Reissued Patent: Aug. 3, 2010

(54) PLASMA DISPLAY AND METHOD FOR PRODUCING THE SAME

(75) Inventors: Katsuyoshi Yamashita, Osaka (JP); Yoshiki Sasaki, Osaka (JP); Junichi Hibino, Osaka (JP); Masafumi Ookawa, Osaka (JP); Masaki Aoki, Osaka (JP)

(73) Assignee: Panasonic Corporation, Osaka (JP)

(21) Appl. No.: 11/580,316

(22) PCT Filed: Oct. 10, 2000

(86) PCT No.: PCT/JP00/07019

§ 371 (c)(1),
(2), (4) Date: Jul. 30, 2002

(87) PCT Pub. No.: WO01/29858

PCT Pub. Date: Apr. 26, 2001

Related U.S. Patent Documents

Reissue of:
(64) Patent No.: 6,803,723
Issued: Oct. 12, 2004
Appl. No.: 10/110,955
Filed: Jul. 30, 2002

(30) Foreign Application Priority Data

Oct. 19, 1999 (JP) ..... 11-296327

(51) Int. Cl.
*H01J 17/49* (2006.01)
*G09G 3/10* (2006.01)

(52) U.S. Cl. ..... 313/586; 315/169.3
(58) Field of Classification Search ..... 313/582–587
See application file for complete search history.

(56) References Cited

U.S. PATENT DOCUMENTS

| | | | | |
|---|---|---|---|---|
| 6,160,345 | A | 12/2000 | Tanaka et al. | |
| 6,200,182 | B1 * | 3/2001 | Nanto et al. | 445/24 |
| 6,287,995 | B1 * | 9/2001 | Lee | 501/15 |
| 6,353,287 | B1 * | 3/2002 | Sasaki et al. | 313/582 |
| 6,419,540 | B1 | 7/2002 | Tanaka et al. | |
| 6,528,944 | B1 * | 3/2003 | Kishi et al. | 313/582 |
| 6,600,265 | B1 * | 7/2003 | Ebihara et al. | 313/586 |
| 6,761,608 | B2 | 7/2004 | Tanaka et al. | |
| 6,803,723 | B1 | 10/2004 | Yamashita et al. | |

FOREIGN PATENT DOCUMENTS

| | | | |
|---|---|---|---|
| CN | 1200554 | | 12/1998 |
| CN | 1201365 | C | 5/2005 |
| JP | 4-47639 | * | 2/1992 |
| JP | 6-267424 | * | 9/1994 |
| JP | 9-71403 | * | 3/1997 |
| JP | 9-063488 | * | 3/1997 |
| JP | 09-259768 | | 3/1997 |
| JP | 09-063488 | | 7/1997 |
| JP | 9-259768 | * | 10/1997 |
| JP | 10-283936 | * | 10/1998 |

* cited by examiner

*Primary Examiner*—Nimeshkumar D. Patel
*Assistant Examiner*—Christopher M Raabe

(57) ABSTRACT

A plasma display device has a first plate and a second plate which face each other with a discharge space therebetween, and a sealing member which is provided between the first and second plates to seal the discharge space at edges of the first and second plates. A plurality of electrodes are formed on the inner major surface of the first or second plate. An electrode diffusion preventive layer is formed in each area where the plurality of electrodes cross over the sealing member, so as to avoid direct contact between the plurality of electrodes and the sealing member. As a result, problems such as breaking of the electrodes can be avoided. This construction is especially effective when the electrodes contain Ag.

25 Claims, 8 Drawing Sheets

PLASMA DISPLAY AND METHOD FOR PRODUCING THE SAME

Matter enclosed in heavy brackets [ ] appears in the original patent but forms no part of this reissue specification; matter printed in italics indicates the additions made by reissue.

TECHNICAL FIELD

The present invention relates to a plasma display device such as a plasma display panel used for display, and a manufacturing method for the plasma display device. The invention in particular relates to improvements to a sealing process.

BACKGROUND ART

Plasma display panels (PDPs) are a type of plasma display devices. PDPs enable large-screen slimline displays to be produced relatively easily, and so are receiving attention as the coming generation of display panels. Sixty-inch models have already been commercialized.

FIG. 5 is a partially sectional and perspective view showing a main construction of a typical surface discharge AC (alternating current) PDP. In the drawing, the direction z represents the direction along the thickness of the PDP, and the plane xy represents a plane which is parallel with the panel plane of the PDP. As illustrated, the PDP 2 is roughly made up of a front panel 20 and a back panel 26 which are arranged with their major surfaces facing each other.

A front panel glass 21 is a substrate of the front panel 20. A pair of display electrodes 22 and 23 (an X electrode 22 and a Y electrode 23) are formed on one of the major surfaces of the front panel glass 21 so that each electrode runs along the direction x. Surface discharge is performed between these electrodes. The display electrodes 22 and 23 are formed by placing bus lines 221 and 231 made of a mixture of Ag and glass, on top of transparent electrodes 220 and 230 formed from ITO (Indium Tin Oxide) and the like.

A dielectric layer 24 made of a dielectric material is formed at the center of the major surface of the front panel glass 21 on which the display electrodes 22 and 23 have been arranged. A protective layer 25 having the same size as the dielectric layer 24 is formed on the dielectric layer 24.

A back panel glass 27 is a substrate of the back panel 26. A plurality of address electrodes 28 are formed in stripes on one of the major surfaces of the back panel glass 27 with a predetermined spacing, so that each electrode runs along the direction y. The address electrodes 28 are formed from a mixture of Ag and glass, like the bus lines 221 and 231. A dielectric layer 29 made of a dielectric material is formed at the center of the major surface of the back panel glass 27 so as to cover the address electrodes 28. Barrier ribs 30 are arranged on the dielectric layer 29 at the gaps between the adjacent address electrodes 28. Phosphor layers 31–33 corresponding to the colors of red (R), green (G), and blue (B) are applied to the side faces of the adjacent barrier ribs 30 and the surface of the dielectric layer 29 between the adjacent barrier ribs 30.

Such constructed front panel 20 and back panel 26 are positioned so that the address electrodes 28 cross over the display electrodes 22 and 23 at right angles. The front panel 20 and the back panel 26 are then sealed at their edges to make the inside airtight. In more detail, frit glass as a sealing member 40 is applied to the edges of the front panel glass 21 (more precisely, around the dielectric layer 24) and the edges of the back panel glass 27 (more precisely, around the dielectric layer 29), as shown in a top view of FIG. 6. This sealing member 40 is melted to seal the panels 20 and 26. Here, the edges 211 and 212 of the front panel glass 21 and the edges 271 and 272 of the back panel glass 27 are outlets for respectively connecting the display electrodes 22 and 23 and the address electrodes 28 to outside drive circuits (not illustrated).

Note that in FIG. 6 the number of display electrodes 22 and 23 and the number of address electrodes 28 are fewer than in actual PDPs for purposes of illustration. The electrodes are indicated by solid lines. Also, the positions of the sealing member 40 and dielectric layer 24 are indicated by solid lines.

A discharge gas (an enclosed gas) including Xe is introduced between the front panel 20 and the back panel 26 which are sealed together, at a predetermined pressure (typically about 40 kPa–66.5 kPa).

As a result, the spaces which are separated by the dielectric layer 24, the phosphor layers 31–33, and the adjacent barrier ribs 30 between the front panel 20 and the back panel 26 become discharge spaces 38. Also, the areas at which the pairs of adjacent display electrodes 22 and 23 cross over the address electrodes 28 with the discharge spaces 38 in between become cells for image display (not illustrated).

To drive the PDP, discharge is started between the address electrode 28 and the display electrode 22 or 23 in each cell. Then ultraviolet light of short wavelength (Xe resonance lines with a wavelength of about 147 nm) is generated from glow discharge between the pair of display electrodes 22 and 23, and excites the phosphor layers 31–33 to emit light. This produces an image display.

The above constructed PDP, however, has the following problem.

FIG. 7 is a sectional view of an edge part of the PDP and its vicinity (taken along an address electrode 28). The sealing member 40 made of frit glass is melted and fixed between the back panel glass 27 and the dielectric layer 24, and also melted and fixed between the address electrode 28 and the dielectric layer 24 as shown in the drawing. When melting the sealing member 40 between the address electrode 28 and the dielectric layer 24, the address electrode 28 is heated together with the sealing member 40, which causes Ag particles in the address electrode 28 to diffuse and seep into the sealing member 40.

This diffusion of Ag particles cause the address electrode 28 to partially break and its conductivity to drop. This may even result in shortening of a plurality of address electrodes 28. Moreover, the seepage of Ag particles in the sealing member 40 degrades the sealing member 40 and reduces its sealing performance.

The same problem may occur between the sealing member 40 and the display electrode 22 (23). FIG. 8 is a sectional view showing an edge part of the PDP and its vicinity (taken along a bus line 221 (231)). The drawing shows the state where Ag particles in the bus line 221 has seeped into the sealing member 40. This causes the bus line 221 (231) of the display electrode 22 (23) to short out or break, resulting in a decrease in performance of the PDP.

This problem is especially evident with PDPs that have a fine cell structure such as those for use in high-definition television, i.e., PDPs that have very narrow bus lines and address electrodes. An immediate solution is required.

DISCLOSURE OF INVENTION

The present invention was conceived in view of the problem described above, and has a primary object of providing a plasma display device which can exhibit favorable display performance even when the plasma display device has a fine cell structure like those for use in high-definition television, and a manufacturing method for the plasma display device.

The stated object can be achieved by a plasma display device having a first plate and a second plate which face each other with a discharge space in between, and a sealing member which is provided between the first and second plates so as to seal the discharge space at outer edges of the first and second plates, the plasma display device including: a plurality of electrodes which are formed across an inner major surface of one of the first and second plates, and an electrode diffusion preventive layer which is interposed between the sealing member and each of the plurality of electrodes.

With the provision of the electrode diffusion preventive layer, the electrode material is kept from diffusing and seeping into the sealing member, with it being possible to prevent shorting or breaking of the plurality of electrodes. Hence favorable display performance is maintained while the plasma display device is driven.

The present invention is especially effective if each of the plurality of electrodes includes Ag.

Here, the electrode diffusion preventive layer may be formed from a dielectric material whose softening point is higher than a [melting point of the sealing member] *temperature at which the sealing member melts*.

Here, the electrode diffusion preventive layer may include glass and an oxide filler.

The stated object can also be achieved by a plasma display device including: a plurality of first electrodes which are formed across a major surface of a first plate; a first dielectric layer which is formed on the major surface of the first plate on which the plurality of first electrodes have been formed, the first plate and a second plate being set so that the first dielectric layer faces the second plate with a discharge space in between; and a sealing member which is provided between the first and second plates so as to seal the discharge space at outer edges of the first and second plates, wherein the first dielectric layer has a softening point that is higher than a [melting point of the sealing member] *temperature at which the sealing member melts*, and the first dielectric layer is extended and interposed between the sealing member and each of the plurality of first electrodes.

Here, the plasma display device may further include: a plurality of second electrodes which are formed across a major surface of the second plate; and a second dielectric layer which has a softening point higher than the [melting point of the sealing member] *temperature at which the sealing member melts* and is formed on the major surface of the second plate on which the plurality of second electrodes have been formed, wherein the second dielectric layer is extended and interposed between the sealing member and each of the plurality of second electrodes.

By interposing the first dielectric layer (the second dielectric layer) between the sealing member and the plurality of first electrodes (between the sealing member and the plurality of second electrodes), the substantially same effects produced by the provision of the electrode diffusion preventive layer can be attained.

BEST MODE FOR CARRYING OUT THE INVENTION

1. First Embodiment

1-1. Construction of Characterizing Portions of a PDP

Figure 1:
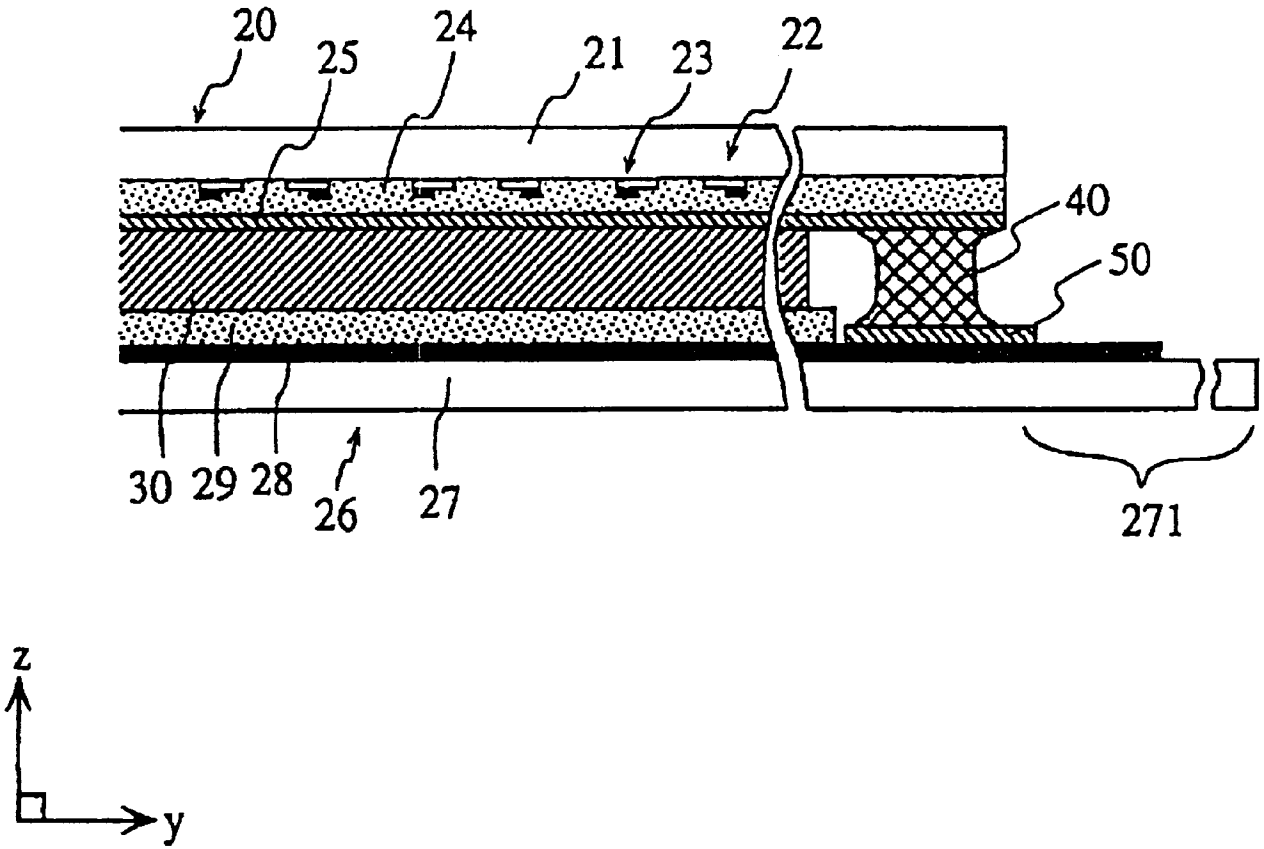
FIG. 1 is a sectional view of an edge part of a PDP to which the first embodiment of the invention relates (taken along an address electrode).
Figure 5:
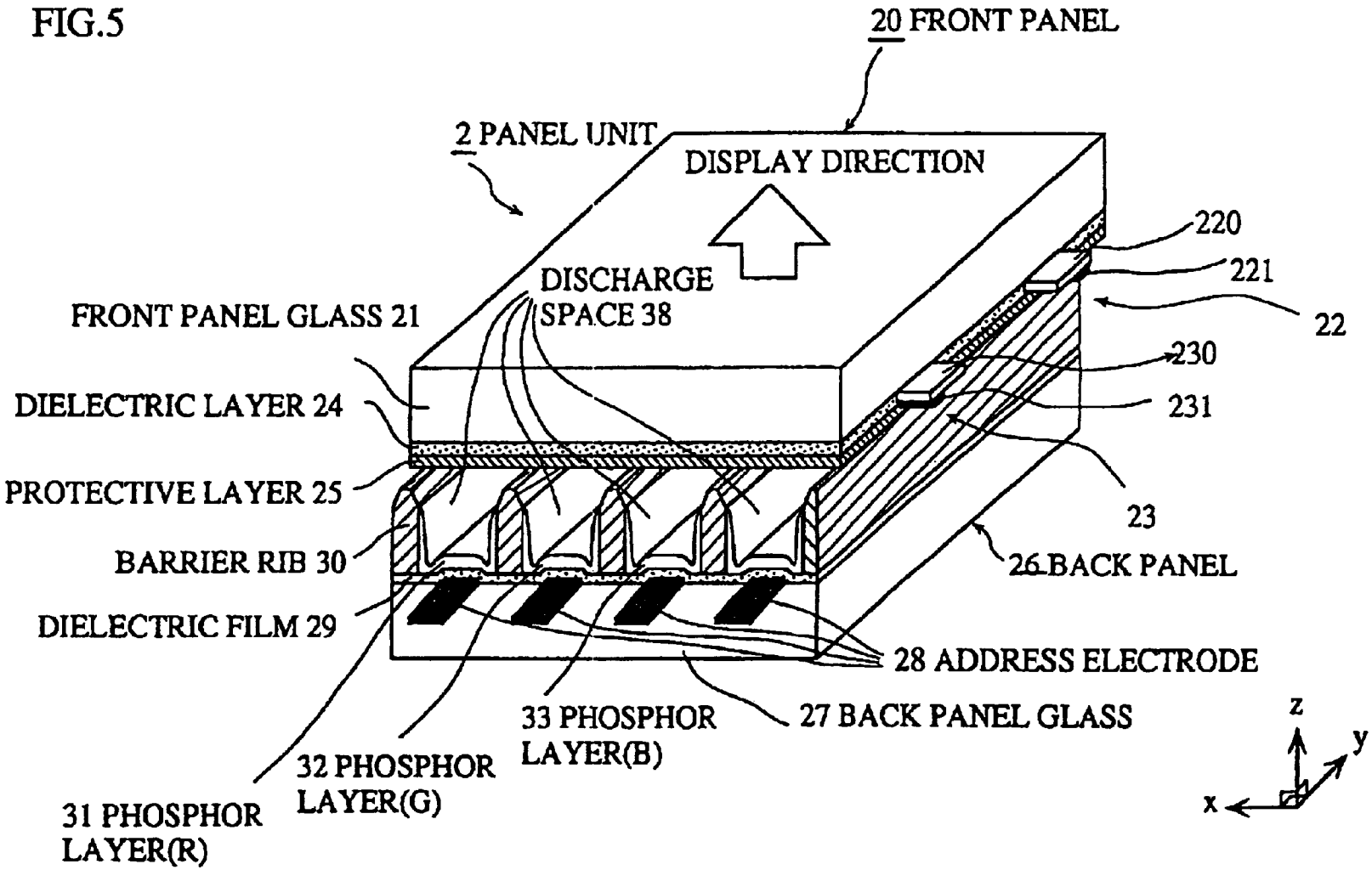
FIG. 5 is a partially sectional and perspective view showing a construction of a surface discharge AC PDP.

An internal construction of a PDP to which the first embodiment of the invention relates is fundamentally similar to that shown in FIG. 5. The difference with the conventional PDP, however, lies in the construction around the sealing member 40. As can be seen in a sectional view of a part of the PDP around the sealing member 40 in FIG. 1, in the first embodiment the sealing member 40 is not in direct contact with the back panel 26, as an electrode diffusion preventive layer 50 is interposed between the sealing member 40 and the back panel glass 27 (and the address electrode 28).

As one example, the electrode diffusion preventive layer 50 is formed from glass and a filler made of oxides (e.g. $Al_2O_3$, $TiO_2$). The softening points (about 560° C.) of these dielectric materials are higher than the [melting point] *temperature at which the sealing member melts* (about 360° C.) of the frit glass in the sealing member 40.

The electrode diffusion preventive layer 50 is applied around the dielectric layer 24 so as to assume a thickness of about 10 μm.

1-2. Effects of the Electrode Diffusion Preventive Layer

Conventionally, the front panel 20 and the back panel 26 are sealed with the sealing member 40 and the address electrodes 28 being in contact with each other at the edges of the back panel glass 27. The sealing is done by melting the sealing member 40 in a high-heat oven and then cooling it.

Figure 7:
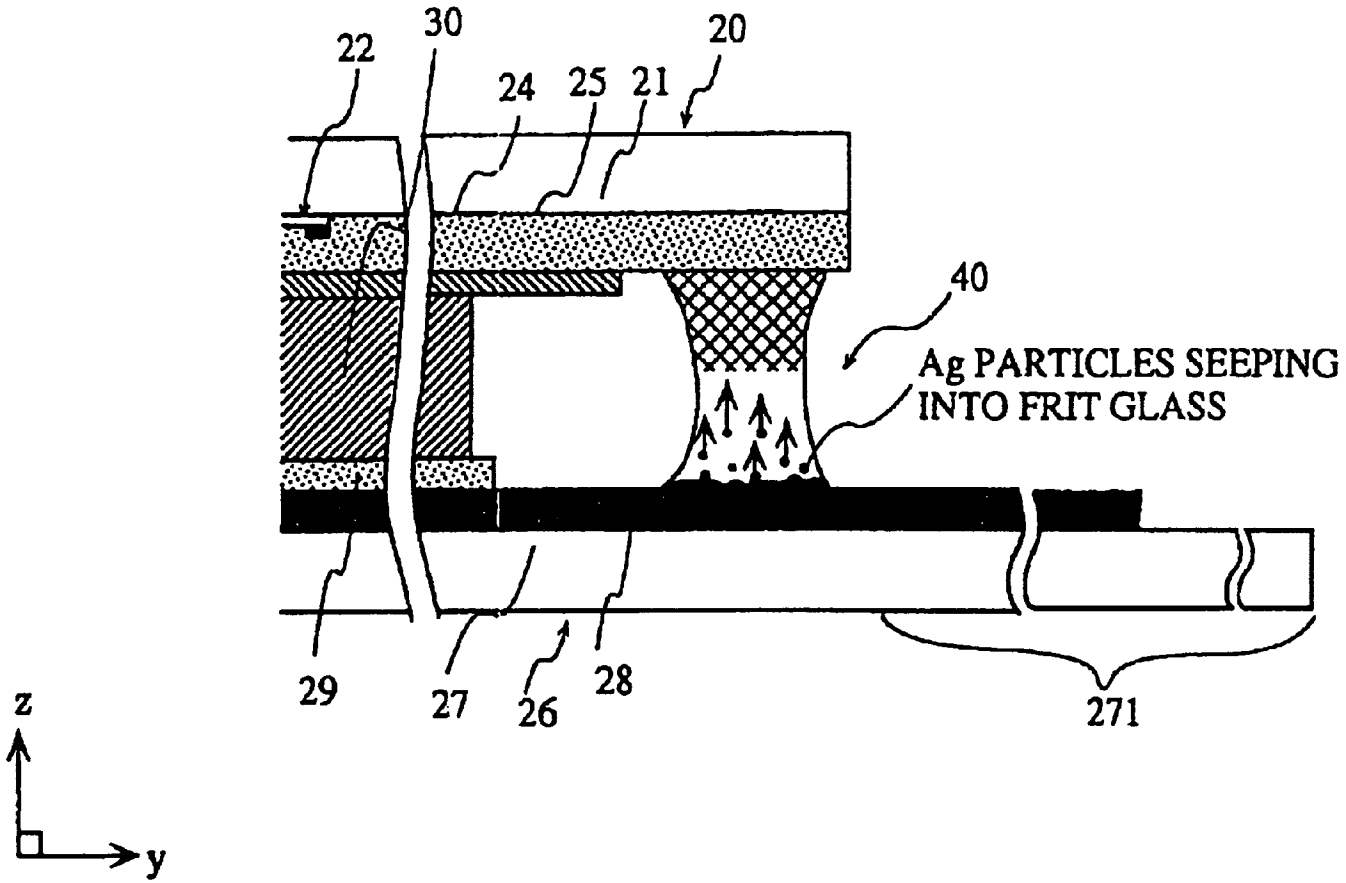
FIG. 7 is a sectional view of an edge part of a conventional PDP (taken along an address electrode).
Figure 8:
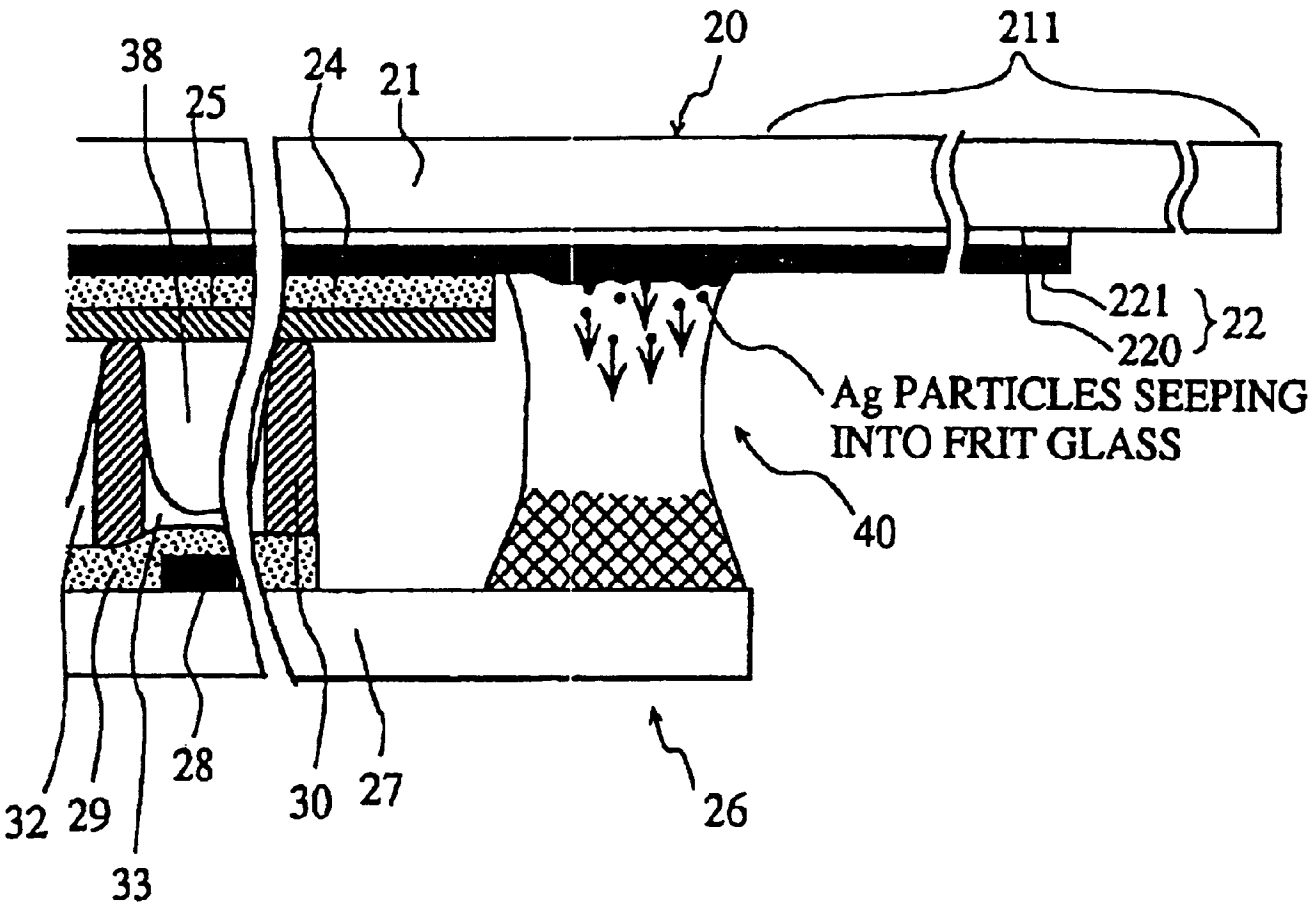
FIG. 8 is a sectional view of an edge part of the conventional PDP (taken along a display electrode).

In this sealing process, the address electrode 28 (including Ag and glass) melts to some extent together with the sealing member 40, due to the heating in the high-heat oven. Since the [melting point of the frit glass] *temperature at which the frit glass melts* is lower than the [melting point] *temperature at which the address electrode 28 melts* (e.g. around 530° C.) of the address electrode 28, the frit glass melt with a lower viscosity than the address electrode 28. Thus, the two different kinds of materials, namely the sealing member 40 and the address electrode 28, are in contact with each other in their melting states. This being so, Ag particles present in the address electrode 28 diffuse and seep into the sealing member 40 which has a lower viscosity than the address electrode 28, as shown in FIG. 7.

The inventors of the present application found that such diffusion of Ag particles tends to cause a plurality of address electrodes 28 to short out. The inventors also found that depending on the extent of diffusion of Ag particles of a particular address electrode 28, the address electrode 28 itself may break.

Such problems are particularly evident with PDPs that have a fine cell structure such as those for use in high-definition television, i.e. PDPs that have very narrow address electrodes 28. These problems require an immediate solution.

To solve the problems, the electrode diffusion preventive layer 50 is provided in the PDP in the first embodiment. Which is to say, the front panel 20 and the back panel 26 are sealed with the electrode diffusion preventive layer 50 and the sealing member 40 being interposed in between, so as to avoid the sealing member 40 from being in contact with the address electrode 28. This electrode diffusion preventive layer 50 has a softening point of 560° C., which is higher than the [melting point of the sealing member 40] *temperature at which the sealing member 40 melts*.

Accordingly, even when the address electrode 28 and the sealing member 40 melt in the sealing process, Ag particles in the address electrode 28 will not diffuse and seep into the sealing member 40, since the electrode diffusion preventive layer 50 is interposed between the address electrode 28 and the sealing member 40. Also, the electrode diffusion preventive layer 50 is in a more favorable solid state than the sealing member 40 during the sealing process. This effectively prevents the Ag particles of the address electrode 28 from seeping into the sealing member 40.

As a result, the problems such as shorting and electrical break of a plurality of address electrodes 28 can be avoided. This enables the PDP to exhibit favorable display performance.

1-2. Manufacturing Method for the PDP

One example method for manufacturing the PDP of the first embodiment is explained below.

1-2-a. Manufacture of the Front Panel

A front panel glass 21 is made of soda lime glass and has a thickness of about 2.6 mm. As one example, the front panel glass 21 is 600 mm long and 950 mm wide.

A plurality of pairs of display electrodes 22 and 23 are formed on the front panel glass 21 at a predetermined pitch, so that each electrode extends along the direction of the width of the front panel glass 21 (the direction x). The formation of the display electrodes 22 and 23 can be performed using the following photo-etching method.

First, a photoresist (e.g. an ultraviolet-curing resist) is applied to one of the major surfaces of the front panel glass 21 so as to assume a thickness of about 0.5 μm. A photomask of a predetermined pattern is placed on top of that, and ultraviolet light is applied. The result is soaked in a developer to wash away parts which have not been cured. After this, a transparent electrode material (ITO) is applied to the gaps of the resist on the front panel glass 21 using CVD. The resist is then washed away with a cleansing liquid to obtain transparent electrodes 220 and 230.

Following this, bus lines 221 and 231 with a thickness of about 4 μm are formed on the transparent electrodes 220 and 230, using a metal material mainly composed of Ag (e.g. DC202 photoimageable Ag conductor produced by E.I. du Pont de Nemours and Company, which has a [melting point] *temperature at which the material melts* of 580° C.). The formation of the bus lines 221 and 231 may be performed using photo-etching or screen printing. Screen printing is performed as follows. A mesh is attached to a rectangular frame which is larger than the front panel glass 21. This mesh is pressed against the front panel glass 21, and a paste including Ag is applied to the major surface of the front panel glass 21 through the mesh using a squeegee.

This completes the display electrodes 22 and 23.

Next, a lead glass paste is applied to the major surface of the front panel glass 21 on which the display electrodes 22 and 23 are arranged, using screening printing. The thickness of the coating is around 15–45 μm. The glass paste is then baked to form a dielectric layer 24.

Here, the dielectric layer 24 is 550 mm long and 900 mm wide, and is centered on the major surface of the front panel glass 21.

A protective layer 25 with a thickness of about 0.3–0.6 μm is formed on the dielectric layer 24 using evaporation, CVD (chemical-vapor deposition), or the like. Magnesium oxide (MgO) is typically used for the protective layer 25. However, when partially changing the material of the protective layer 25, such as when using MgO and alumina ($Al_2O_3$) separately, the protective layer 25 is formed by patterning that uses a metal mask as appropriate.

This completes the front panel 20.

1-2-b. Manufacture of the Back Panel

A back panel glass 27 is made of soda lime glass and has a thickness of about 2.6 mm. As one example, the back panel glass 27 is 650 mm long and 900 mm wide, like the front panel glass 21.

A conductor material (with a [melting point] *temperature at which the material melts* of about 520° C.) including Ag and glass is applied to one of the major surfaces of the back panel glass 27 in stripes at a predetermined pitch using screen printing or the like, so that each electrode extends along the direction of the width of the back panel glass 27. The result is baked to form a plurality of address electrodes 28 with a thickness of about 5 μm. Here, to keep with the requirements for a 40-inch NTSC or VGA television, the distance between the adjacent address electrodes 28 is no greater than around 0.4 mm. In this embodiment, the distance between the address electrodes 28 is 0.3 mm as one example.

The pitch of the address electrodes 28 determined here is equivalent to the pitch of the barrier ribs 30.

Following this, a lead glass paste is applied to the entire surface of the back panel glass 27 on which the address electrodes 28 are arranged, so as to assume a thickness of about 20–30 μm. The result is baked to form a dielectric layer 29.

Next, barrier ribs 30 with a height of about 120 μm are formed in the gaps (about 150 μm) between the adjacent address electrodes 28 on the dielectric layer 29, using the same glass material as the dielectric layer 29. The barrier ribs 30 can be formed, for example, by repeatedly screen-printing a paste which includes the above glass material and then baking it. The barrier ribs 30 can also be formed using sandblasting.

Once the barrier ribs 30 have been formed, the phosphor inks of the three colors of red (R), green (G), and blue (B) are applied one at a time to the side faces of the barrier ribs 30 and the exposed surface of the dielectric layer 29 between the barrier ribs 30. The result is dried and baked to form phosphor layers 31–33.

Examples of phosphor materials typically used for PDPs are given below:

Red phosphor: $(Y_xGd_{1-x})BO_3:Eu^{3+}$

Green phosphor: $Zn^2SiO_4:Mn$

Blue phosphor: $BaMgAl_{10}O_{17}:Eu^{3+}$
(or $BaMgAl_{14}O_{23}:Eu^{3+}$)

A powder with an average particle diameter of about 3 μm may be used for each phosphor material. Though there are several methods for applying phosphor ink, this embodiment employs a known meniscus method that expels phosphor ink from a fine nozzle while forming a meniscus (a cross-linking due to surface tension). This method has an advantage of evenly applying phosphor ink to desired parts. However, it should be obvious that the present invention is not limited to this method. Other methods such as screen printing are also applicable.

This completes the back panel 26.

Though the front panel glass 21 and the back panel glass 27 are made of soda lime glass in this embodiment, this is a mere example of material that can be used for the front panel glass 21 and the back panel glass 27, which may be formed from other materials.

1-2-c. Manufacture of the Electrode Diffusion Preventive Layer

Figure 6:
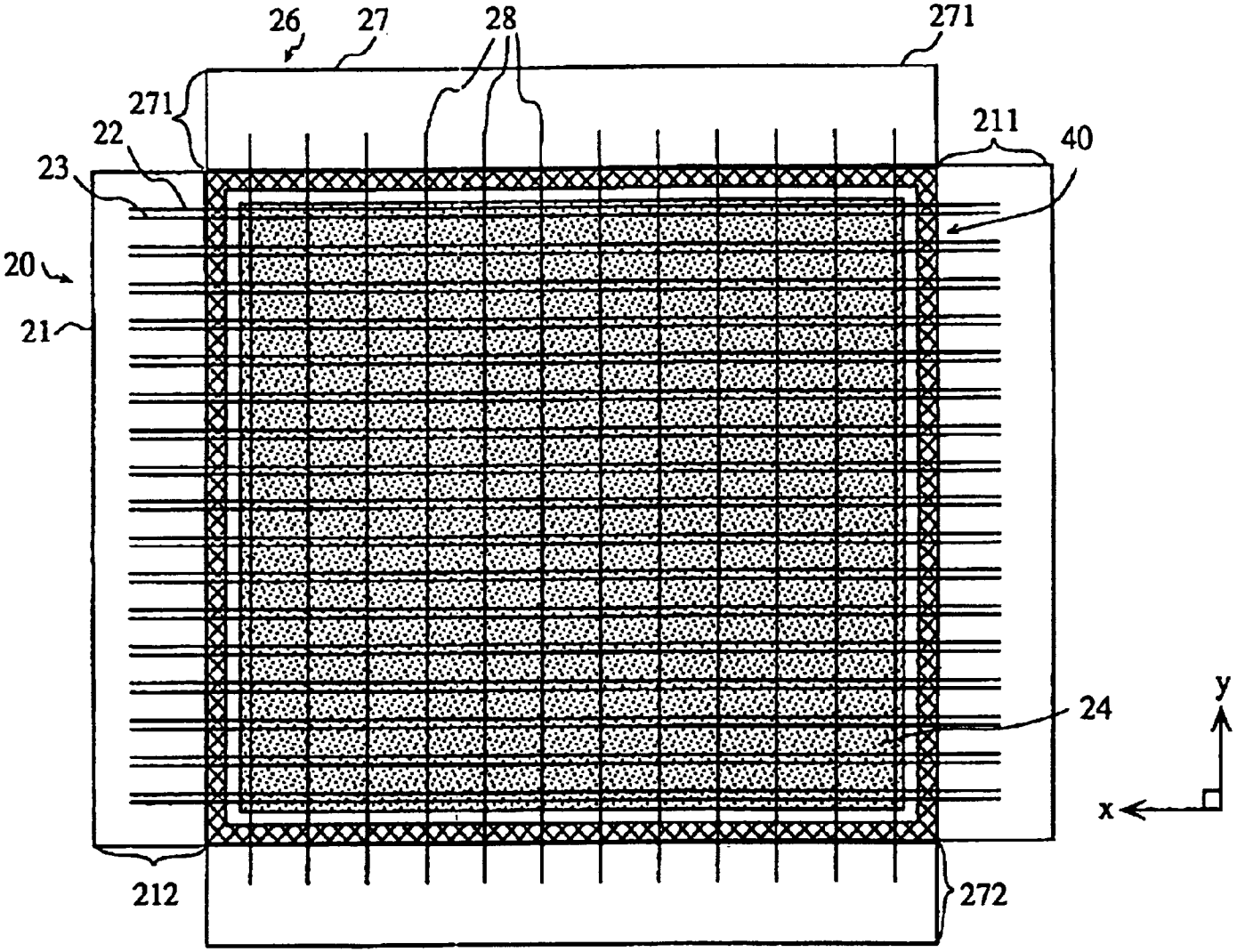
FIG. 6 is a top view of the PDP.

A glass paste made of lead glass and an oxide filler is applied around the dielectric layer 29 in the back panel 26 (see FIG. 6). The glass paste is baked at about 560° C. The softening point of this glass paste is higher than the [melting point of the frit glass] *temperature at which the frit glass melts* in the sealing member 40 (described later). The softening point of the glass paste is preferably at least 50° C. higher than the [melting point of the sealing member 40] *temperature at which the sealing member 40 melts*. Also, it was found through experimentation that the softening point of the glass paste is preferably 300° C. or above.

This completes the electrode diffusion preventive layer 50.

1-2-d. Sealing Process

A paste of frit glass for the sealing member 40 is applied onto the electrode diffusion preventive layer 50. As one example, a paste of $PbO—B_2O_3—SiO_2$ frit glass with a softening point of 360° C. (ASF2300 manufactured by Asahi Glass Co., Ltd.) is applied using screen printing. Other commercially available materials such as ASF2300M and ASF2452 (with softening points of 350–360° C.) may instead be used for the frit glass.

Although other commercially available materials may be used for the frit glass as necessary, it is desirable to select a material that effectively suppresses the occurrence of bubbles and the reaction with electrodes.

The front panel 20 and the back panel 26 are positioned so that the protective layer 25 and the barrier ribs 30 face each other, and the two panels 20 and 26 are sandwiched together so that their longitudinal directions cross at right angles.

The two panels 20 and 26 are then put in a high-heat oven and undergo sintering (at about 450° C. for 0.5 hour).

During this sintering, the address electrode 28 (including Ag and glass) melt to some extent together with the sealing member 40. Here, the viscosity of the melted sealing member 40 is lower than the viscosity of the melted address electrode 28. In conventional PDPs, the sealing member 40 is in direct contact with the address electrode 28. Therefore, Ag particles in the address electrode 28 diffuse and seep into the sealing member 40 due to the difference in viscosity of the sealing member 40 and address electrode 28, which causes the address electrode 28 to break or short out.

In the first embodiment, however, the electrode diffusion preventive layer 50 whose softening point is higher than the [melting point of the sealing member 40] *temperature at which the sealing member 40 melts* is provided between the address electrode 28 and the sealing member 40. This keeps Ag particles in the address electrode 28 from diffusing and seeping into the sealing member 40. In other words, the electrode diffusion preventive layer 50 has a higher softening point than the sealing member 40. Accordingly, Ag particles in the address electrode 28 are less prone to diffuse and seep into the electrode diffusion preventive layer 50 than into the sealing member 40. As a result, the problem of the Ag particles diffusing and seeping into the sealing member 50 is avoided.

Hence the sealing process can be favorably carried out in this embodiment.

After the sintering of the front panel 20 and the back panel 26, cooling is performed to secure the sealing member 40.

1-2-e. Completion of the PDP

Following this, the discharge spaces are evacuated to produce a high vacuum (around $1.1\times10^{-4}$ Pa), and discharge gas such as an Ne—Xe mixture, an He—Ne—Xe mixture, or an He—Ne—Xe—Ar mixture is introduced into the discharge spaces at a specified pressure (e.g. $2.7\times10^5$ Pa)

It was found through experimentation that the filling gas pressure is preferably in a range of 800 to $5.3\times10^5$ Pa to improve luminous efficiency.

Lastly, drive circuits (not illustrated) for driving the display electrodes 22 and 23 and the address electrodes 28 are connected to the edge parts 211, 212, 271, and 272 of the panel glasses 21 and 27, to complete the PDP.

1-3. Modifications to the First Embodiment

Figure 2:
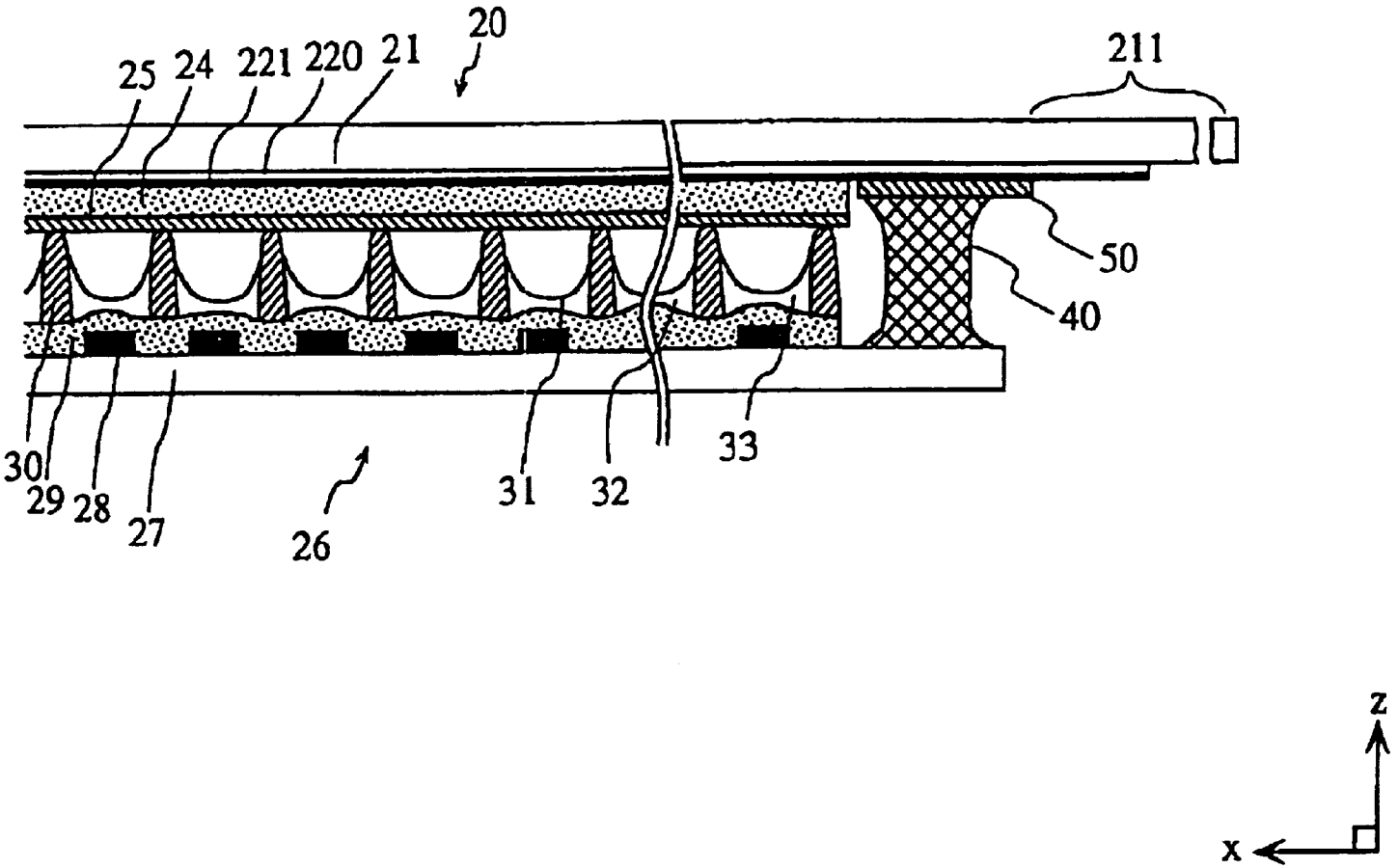
FIG. 2 is a sectional view of an edge part of the PDP in the first embodiment (taken along a display electrode).

The above embodiment describes the case where the electrode diffusion preventive layer 50 is provided between the address electrode 28 and the sealing member 40, but the invention should not be limited to such. As shown in a sectional view of the edge part 211 and its vicinity in FIG. 2, the electrode diffusion preventive layer 50 may be provided between the display electrode 22 (23) (more precisely the bus line 221 (231)) and the sealing member 40. In this way, Ag particles in the bus line 221 (231) will not diffuse and seep into the sealing member 40, with it being possible to prevent the display electrode 22 (23) from breaking or shorting out. As a result, favorable display performance can be delivered.

Also, the electrode diffusion preventive layer 50 may be provided both between the address electrode 28 and the sealing member 40 and between the bus line 221 (231) and the sealing member 40.

2. Second Embodiment

Figure 3:
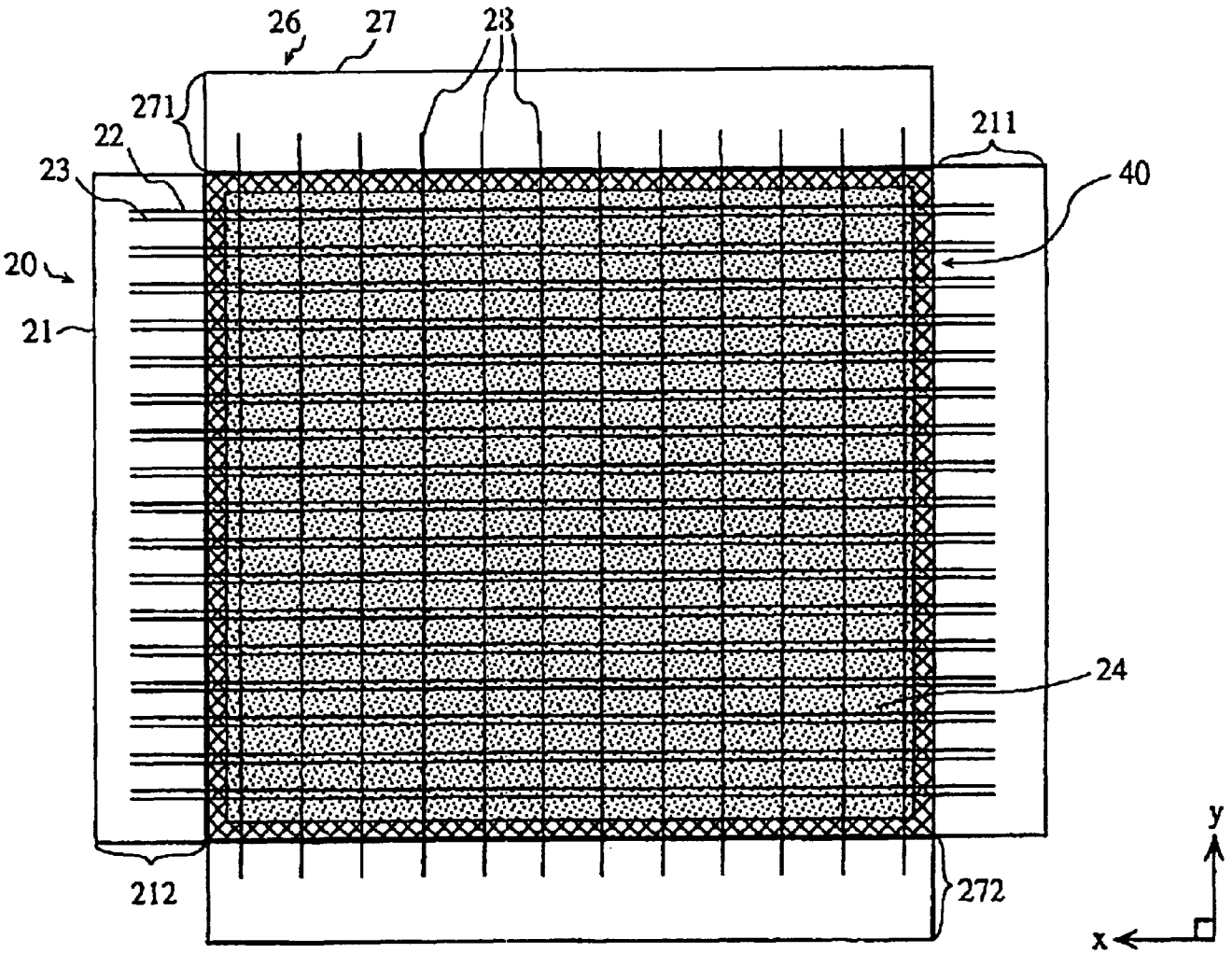
FIG. 3 is a top view of a PDP to which the second embodiment of the invention relates.

While the first embodiment uses the electrode diffusion preventive layer 50, the second embodiment has a construction in which the edges of the dielectric layer 29 have been extended to serve as the electrode diffusion preventive layer, as shown in a top view of FIG. 3 (in the drawing, the number of display electrodes 22 and 23 and the number of address electrodes 28 are fewer than in actual PDPs for purposes of illustration with the electrodes being indicated by solid lines, and the positions of the sealing member 40 and dielectric layer 24 are also indicated by solid lines).

Figure 4:
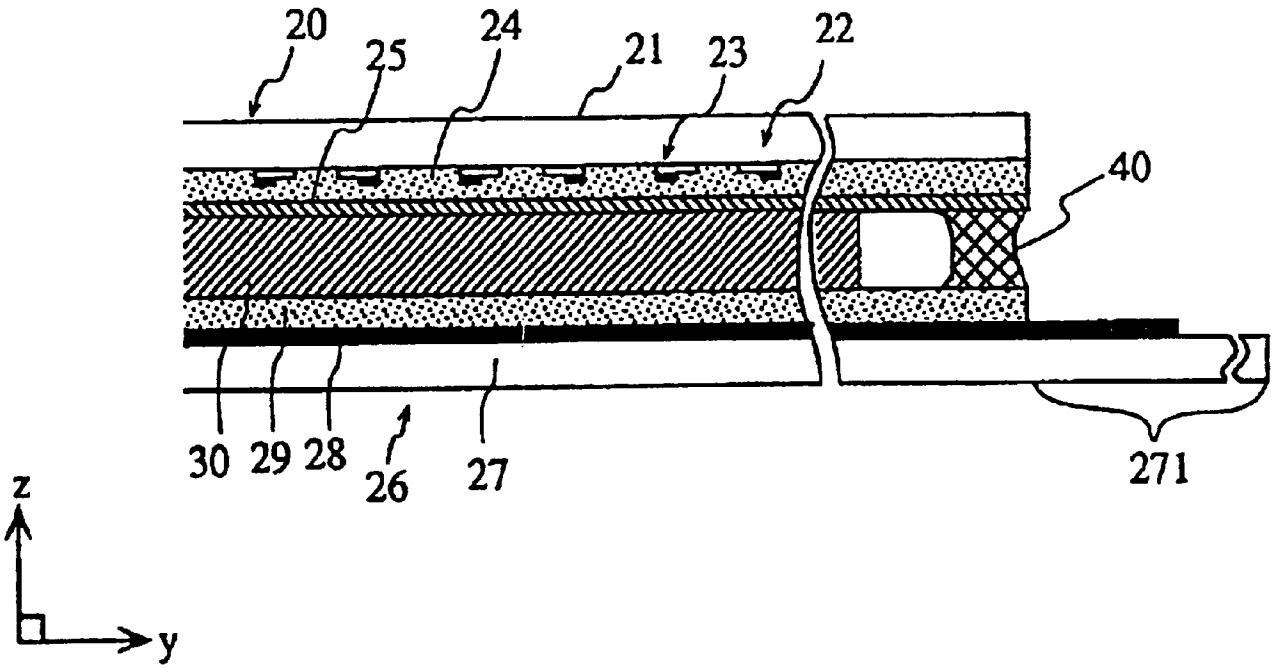
FIG. 4 is a sectional view of an edge part of the PDP in the second embodiment (taken along an address electrode).

In more detail, the extended part of the dielectric layer 29 is interposed between the sealing member 40 and each address electrode 28, as shown in a sectional view of the edge part 271 and its vicinity in FIG. 4.

The dielectric layer 29 in this embodiment has a softening point that is higher than the [melting points of the address electrode 28 and sealing member 40] *temperature at which the address electrode 28 and sealing member 40 melt*, and is resistant to reaction with Ag. The dielectric layer 29 is composed of glass and an oxide filler which are dielectric materials. Silicon nitride (SiN) can be used as the oxide filler. As alternatives, $SiO_2$ or a combination of SiN and $SiO_2$ may be used as the oxide filler. Commercially available materials such as YPT061F ($PbO—B_2O_3—SiO_2$), YPW040 ($PbO—B_2O_3—SiO_2$), and PLS3244 ($PbO—B_2O_3—SiO_2$) produced by Asahi Glass Co., Ltd. are also applicable. The dielectric layer 29 formed from any of these commercially available materials can favorably avoid the problems such as break and shorting of address electrodes 28, thereby delivering excellent effects.

Preferably, the material of the dielectric layer 29 has a softening point which is at least 50° C. higher than the [melting points of the address electrode 28 and sealing member 40] *temperature at which the address electrode 28 and sealing member 40 melt*. Also, the inventors found through experimentation that the diffusion of Ag particles can be prevented if the softening point of the material of the dielectric layer 29 is no lower than 300° C.

Through the use of such a dielectric layer 29, the same effects as the first embodiment can be obtained. Which is to say, since the dielectric layer 29 whose softening point is higher than the [melting points of the address electrode 28 and sealing member 40] *temperature at which the address electrode 28 and sealing member 40 melt* is provided between the address electrode 28 and the sealing member 40, Ag particles in the address electrode 28 are kept from diffusing and seeping into the sealing member 40 in the sealing process. Hence the problems such as break and shorting of address electrodes 28 are avoided. This enables the PDP to deliver favorable display performance.

Though the dielectric layer 29 is extended to reach the area display below the sealing member 40 in FIG. 4, the invention should not be limited to such. For instance, the dielectric layer 24 may be extended to reach the area directly below the sealing member 40. This prevents Ag particles in the bus line 221 (231) of the display electrode 22 (23) from diffusing and seeping into the sealing member 40. Here, the dielectric layer 24 is preferably formed from glass and an oxide filler, as in the case of the dielectric layer 29.

Also, both the dielectric layer 24 and the dielectric layer 29 may be extended.

2-1. Modifications to the Second Embodiment

The second embodiment can be applied to PDPs in which a dielectric layer is provided to only one of the front and back panels.

INDUSTRIAL APPLICABILITY

The present invention can be used for PDPs for use in television receivers or the like, and manufacturing methods for such PDPs.

What is claimed is:

1. A plasma display device having a first plate and a second plate which face each other with a discharge space in between, and a sealing member which is provided between the first and second plates so as to seal the discharge space at edges of the first and second plates, the plasma display device comprising:

a plurality of electrodes, each including Ag, which are formed across an inner major surface of one of the first and second plates, and an electrode diffusion preventive layer which includes glass and an oxide filler is interposed between the sealing member and each of the plurality of electrodes, wherein the electrode diffusion preventive layer is formed from a dielectric material whose softening point is higher than a [melting point of the sealing member] *temperature at which the sealing member melts*.

2. The plasma display device of claim 1, wherein the softening point of the electrode diffusion preventive layer is at least 50° C. higher than the [melting point of the sealing member] *temperature at which the sealing member melts*.

3. The plasma display device of claim 1, wherein the softening point of the electrode diffusion preventive layer is no lower than 300° C.

4. A plasma display device comprising:

a plurality of first electrodes each including Ag which are formed across a major surface of a first plate;

a first dielectric layer which is formed on the major surface of the first plate on which the plurality of first electrodes have been formed, the first plate and a second plate being set so that the first dielectric layer faces the second plate with a discharge space in between; and a sealing member which is provided between the first and second plates so as to seal the discharge space at edges of the first and second plates, wherein the first dielectric layer includes glass and an oxide filler, has a softening point that is higher than a [melting point of the sealing member] *temperature at which the sealing member melts*, and the first dielectric layer is extended and interposed between the sealing member and each of the plurality of first electrodes.

5. The plasma display device of claim 4, wherein the softening point of the first dielectric layer is at least 50° C. higher than the [melting point of the sealing member] *temperature at which the sealing member melts*.

6. The plasma display device of claim 4, further comprising:

a plurality of second electrodes which are formed across a major surface of the second plate; and a second dielectric layer which has a softening point higher than the [melting point of the sealing member] *temperature at which the sealing member melts* and is formed on the major surface of the second plate on which the plurality of second electrodes have been formed, wherein the second dielectric layer is extended and interposed between the sealing member and each of the plurality of second electrodes.

7. The plasma display device of claim 6, wherein each of the plurality of second electrodes includes Ag.

8. The plasma display device of claim 6, wherein the second dielectric layer includes glass and an oxide filler.

9. The plasma display device of claim 8, wherein the oxide filler includes at least one of SiN and SiO2.

10. The plasma display device of claim 6, wherein a principal component of the second dielectric layer is a glass material having a softening point of no lower than 300° C.

11. The plasma display device of claim 6, wherein the softening point of the second dielectric layer is at least 50° C. higher than the [melting point of the sealing member] *temperature at which the sealing member melts*.

12. A manufacturing method for a plasma display device having a sealing member forming step for providing a sealing member between a first plate and a second plate which face each other with a discharge space in between, so that the discharge space is sealed at edges of the first and second plates, the manufacturing method comprising the following steps which are performed in the stated order before the sealing member forming step:

an electrode forming step for forming a plurality of electrodes including Ag across an inner major surface of one of the first and second plates; and an electrode diffusion preventive layer forming step for interposing an electrode diffusion preventive layer including glass and an oxide filler between the sealing member and each of the plurality of electrodes, wherein the electrode diffusion preventive layer forming step forms the electrode diffusion preventive layer from a dielectric material whose softening point is higher than a [melting point of the sealing member] *temperature at which the sealing member melts in the sealing member forming step*.

13. The manufacturing method of claim 12, wherein the electrode diffusion preventive layer forming step forms the electrode diffusion preventive layer whose softening point is at least 50° C. higher than the [melting point of the sealing member] *temperature at which the sealing member melts in the sealing member forming step*.

14. The manufacturing method of claim 12, wherein the electrode diffusion preventive layer forming step forms the electrode diffusion preventive layer whose softening point is no lower than 300° C.

15. A manufacturing method for a plasma display device comprising:

a first electrode forming step for forming a plurality of first electrode including Ag across a major surface of a first plate;

a first dielectric layer forming step for forming a first dielectric layer including glass and an oxide filler on the major surface of the first plate on which the plurality of first electrodes have been formed; and a sealing member forming step for providing a sealing member between the first plate and a second plate which are set with the first dielectric layer facing the second plate with a discharge space in between, so that the discharge space is sealed at edges of the first and second plates, wherein in the first dielectric layer forming step, the first dielectric layer is formed from a material whose softening point is higher than a [melting point of the sealing member] *temperature at which the sealing member melts in the sealing member forming step*, and the first dielectric layer is extended and interposed between the sealing member and each of the plurality of first electrodes.

16. The manufacturing method of claim 15, further comprising:

a second electrode forming step for forming a plurality of second electrodes across a major surface of the second plate; and a second dielectric layer forming step for forming a second dielectric layer on the major surface of the second plate on which the plurality of second electrodes have been formed, wherein in the second dielectric layer forming step, the second dielectric layer is formed from a material whose softening point is higher than the [melting point of the sealing member] *temperature at which the sealing member melts in the sealing member forming step*, and the second dielectric layer is extended and interposed between the sealing member and each of the plurality of second electrodes.

17. The manufacturing method of claim 16, wherein the second electrode forming step forms the plurality of second electrodes using Ag.

18. The manufacturing method of claim 16, wherein the second dielectric layer forming steps forms the second dielectric layer from a material that includes glass and an oxide filler.

*19. A manufacturing method for a plasma display device having a sealing member forming step for providing a sealing member between a first plate and a second plate which face each other with a discharge space in between, so that the discharge space is sealed at edges of the first and second plates, the manufacturing method comprising:*

*an electrode forming step for forming a plurality of electrodes that includes Ag across a major surface of one of the first and second plates;*

*an electrode diffusion preventive layer forming step for providing an electrode diffusion preventive layer including glass and an oxide filler onto the major surface of one of the first and second plates; and*

*a sealing member forming step for providing a sealing member onto the electrode diffusion preventive layer, setting the first plate and the second plate so that the electrode diffusion preventive layer faces the second plate with a discharge space in between, and sintering the first plate and the second plate so that the discharge space is sealed at edges of the first and second plates,*

*wherein the electrode diffusion preventive layer forming step forms the electrode diffusion preventive layer from a dielectric material whose softening point is higher than a temperature at which the sealing member melts while sintering the first plate and the second plate in the sealing member forming step.*

*20. The manufacturing method of claim 19, wherein the electrode diffusion preventive layer forming step forms the electrode diffusion preventive layer whose softening point is at least 50° C. higher than the temperature at which the first plate and the second plate are sintered in the sealing member forming step.*

*21. The manufacturing method of claim 19, wherein the electrode diffusion preventive layer forming step forms the electrode diffusion preventive layer whose softening point is no lower than 300° C.*

*22. A manufacturing method for a plasma display device comprising:*

*a first electrode forming step for forming a plurality of first electrodes that include Ag across a major surface of a first plate;*

*a first dielectric layer forming step for forming a first dielectric layer including glass and an oxide filler on the major surface of the first plate on which the plurality of first electrodes have been formed; and*

*a sealing member forming step for providing a sealing member onto the first plate or a second plate, setting the first plate and the second plate so that the first dielectric layer faces the second plate with a discharge space in between, and sintering the first plate and the second plate at a temperature so that the discharge space is sealed at edges of the first and second plates,*

*wherein in the first dielectric layer forming step, the first dielectric layer is formed from a material whose softening point is higher than a temperature at which the sealing member melts while sintering the first plate and the second plate in the sealing member forming step, and the first dielectric layer is extended and interposed between the sealing member and each of the plurality of first electrodes.*

*23. The manufacturing method of claim 22, further comprising:*

*a second electrode forming step for forming a plurality of second electrodes across a major surface of the second plate; and a second dielectric layer forming step for forming a second dielectric layer on the major surface of the second plate on which the plurality of second electrodes have been formed, wherein in the second dielectric layer forming step, the second dielectric*

*layer is formed from a material whose softening point is higher than the temperature at which the first plate and the second plate are sintered in the sealing member forming step, and the second dielectric layer is extended and interposed between the sealing member and each of the plurality of second electrodes.*

*24. The manufacturing method of claim 23, wherein the second electrode forming step forms the plurality of second electrodes using Ag.*

*25. The manufacturing method of claim 23, wherein the second dielectric layer forming step forms the second dielectric layer from a material that includes glass and an oxide filler.*

* * * * *